Patented Sept. 21, 1954

2,689,861

UNITED STATES PATENT OFFICE 2,689,861

AROMATIC ISOCYANATE MANUFACTURE IN THE PRESENCE OF TETRAMETHYLUREA

Wallace W. Thompson, New Castle, Del., assignor to E. I. du Pont de Nemours and Company, Wilmington, Del., a corporation of Delaware No Drawing. Application January 13, 1953, Serial No. 331,101

2 Claims. (Cl. 260—453)

This invention relates to the preparation of aromatic isocyanates. More particularly, it relates to processes in which aromatic isocyanates are prepared by the reaction of the aromatic amine corresponding thereto with phosgene in an inert organic liquid diluent; and still more particularly, it relates to an improvement in such processes, the improvement comprising carrying out the amine-phosgene reaction in the presence of a minor amount of tetramethyl urea.

The general reaction of an aromatic amine with phosgene to obtain the corresponding aromatic isocyanate has long been known. It was shown by Hentschel in 1844 in Berichte, 17, 1284. The technique of carrying out the reaction in the presence of an inert liquid diluent was suggested in 1899 by Vittenet, Bull. Soc. Chim. 21, (3), 952–8; and more recently, in various United States patents such as Hilger, 1, 916,314; Kaase et al., 2,340,757; Greenhalgh et al., 2,311,046; and in Rinke et al. U. S. patent application, Serial No. 405,992, published April 20, 1943.

I have discovered a means for improving prior art processes such as those referred to above which involve the reaction of an aromatic amine with phosgene in an inert organic liquid diluent to give an aromatic isocyanate. It has been suggested that such reactions proceed thru the acid salt of the amine such as an amine hydrochloride or an amine-$CO_2$ adduct either by forming the salt in situ in the process or by starting with the salt, to form the corresponding aromatic carbamyl chloride, which in turn is decomposed to the isocyanate with liberation of hydrogen chloride.

However, whatever the mechanism of the reaction or the actual constitution of the intermediate products formed, it is characteristic of the processes that the reacting mass is thick or viscous during a substantial portion of the reaction period, caused at least in part by the presence of insoluble materials. The result as pointed out by Pinner in "Plastics" (London), 11, 206, 207, is a low rate of reaction and the formation of disubstituted urea or poly urea by-products.

I have found that the objectionable thick viscous reaction systems of the prior art methods can be fluidized by adding to the system a minor amount of tetramethyl urea. In other words, the inclusion of tetramethyl urea in the reaction system serves to dissolve the solids thus making possible such economic benefits as more rapid reaction, less by-product formation, improved yield, and greater production from a given size of reaction vessel.

The mechanism of the solubilizing action of the tetramethyl urea, whether it be chemical or mechanical, is not understood. An understanding of the mechanism is not necessary, however, to successful practice of the improvement. The desired results are attained simply by introducing the tetramethyl urea into the reaction system of the prior art processes. And, therefore, regardless of the actual manner of operation of the tetramethyl urea, the improved process is conveniently described as one which takes place in the presence of the tetramethyl urea.

The tetramethyl urea can be introduced into the reaction system in any convenient manner. It can, for example, be introduced along with one or the other of the reactants. For instance, it can be added to the phosgene reactant in an inert organic liquid diluent, or alternatively, it can be introduced with the aromatic amine or amine salt reactant. Alternatively, it can be added separately to the reaction vessel at the outset of the process or at some intermediate point of the process as required to effect the solubilizing action.

The quantity of tetramethyl urea required in carrying out the processes of the invention is considerably less than a molar equivalent of the amine or phosgene reactant. Thus, it may be considered a catalytic rather than a reactant amount. The optimum amount will vary depending upon the aromatic amine reactant, the inert liquid diluent, the temperature, and other reaction conditions. But, in general, best results are obtained using from 0.02 to 0.03 mol of the tetramethyl urea per mol of the amine reactant. Lesser amounts can, of course, be used at a sacrifice of solubilizing action, and greater amounts can be used altho in general this merely serves to increase the cost without a proportionate increase in benefits.

The improvement in using tetramethyl urea can, as mentioned previously, be incorporated in the prior art processes in which an aromatic amine is reacted with phosgene in an inert organic liquid diluent. Accordingly, the amine reactants that can be used in the processes of the invention are of the kind previously disclosed and suggested for use. They are aromatic primary amines, the term aromatic primary amine being used in the generic sense to embrace monoamines, polyamines, and their amine salts. Illustrative amines are aniline, p-chloroaniline, 3,4-dichloroaniline, benzidine, naphthylamines, naphthylene diamines, phenetidine, p-toluidine, dianisidine, p-aminomethyl benzoate, 3-chloro- 4-isopropylaniline, 3-chloro-p-toluidine, and p-nitroaniline; and the acid salts of such amines.

Illustrative of an inert organic liquid diluents suitable for use in the processes of the invention are xylene, benzene, toluene, o-dichlorobenzene, and similar materials of the kind theretofore disclosed and suggested in the prior art.

The several ingredients are brought together according to a preferred method by first dissolving the phosgene reactant and the tetramethyl urea in the inert organic diluent. A solution of the aromatic primary amine in an inert organic liquid diluent is then added to the phosgene solution gradually. Alternatively, phosgene is introduced into a solution of the amine and the tetramethyl urea in an inert organic liquid diluent. Other manipulative techniques such as simultaneous addition of the ingredients into a reaction vessel can also be used as will be apparent to one skilled in the art especially in view of the prior art teachings on amine-phosgene reactions to give isocyanates.

In general, the conditions of reaction as to proportions, temperature, pressure, and so forth, are similar to those previously employed without tetramethyl urea.

The invention is further illustrated by reference to the following examples.

*Example 1*

Phosgene and tetramethylurea are added to xylene to give a solution containing about 30% by weight phosgene and 0.8% by weight tetramethylurea. This solution is heated to reflux temperature, about 25–35° C., in a vessel equipped with a refrigerated condenser. A solution of p-chloroaniline in xylene, containing about 35% by weight p-chloroaniline, is added gradually over a period of about 60 minutes in amount to provide a total of about 1.2 lbs. of p-chloroaniline per each pound of phosgene in the original phosgene solution.

During the p-chloroaniline addition, the temperature of the reacting mass is gradually increased as required to maintain a reflux of unreacted phosgene. Upon completion of the p-chloroaniline addition, the temperature of the reacting mass is increased to about 100° C. and by-product hydrogen chloride is expelled from the reactor. Finally, the temperature of the reacting mass is increased to about 140–145° C. to expel any unreacted phosgene and any remaining hydrogen chloride. There remains in the reactor, a solution of p-chlorophenyl isocyanate in xylene.

The xylene and isocyanate are separated by distillation in vacuum to isolate the product p-chlorophenyl isocyanate which is a white crystaline solid, M. P. 32° C. The yield of product is approximately 95% of theoretical based on the amine reactant used.

*Example 2*

A solution is prepared by dissolving 2.4 parts by weight of tetramethylurea and 83 parts by weight of phosgene in 265 parts by weight of xylene. While maintaining this solution at room temperature, there is slowly added to it with agitation and cooling a solution of 122 parts by weight of 3,4-dichloroaniline in 270 parts by weight of xylene. The reacting mass is heated to solvent reflux temperature to drive off hydrogen chloride and excess phosgene. There is thus obtained a solution of 3,4-dichlorophenyl isocyanate in xylene and the isocyanate is recovered therefrom by distilling off the xylene in vacuum.

The yield of the isocyanate is determined by reaction with dimethylamine according to the analytical method suggested by Stagg in Analyst, 71, 557 (1946). This is done by adding dimethylamine to the solution of isocyanate in xylene at room temperature to precipitate 3-(3,4-dichlorophenyl)-1,1-dimethylurea. The precipitate is removed by filtration and dried. The yield to isocyanate using this analytical procedure is 92.7%, according to the process of this example, based on dichloroaniline. Employing the same procedure as followed in this example but omitting inclusion of the tetramethylurea, the yield on the same basis is 53.2%.

By selection of the appropriate aromatic primary amine, other aromatic isocyanates which can be prepared according to the foregoing examples and teachings include, for example, 4-biphenyl isocyanate, 4-phenoxyphenyl isocyanate, 3-chloro-4-methoxyphenyl isocyanate, p-phenylene diisocyanate, 2-methyl-p-phenylene diisocyanate, m-chlorophenyl isocyanate, 3,4,5-trichlorophenyl isocyanate, 2,4,5-trichlorophenyl isocyanate, 2,4,6-trichlorophenyl isocyanate, 3,5-dichloro-2-methylphenyl isocyanate, p-bromophenyl isocyanate, 3,4-dibromophenyl isocyanate, m-fluorophenyl isocyanate, and 3-chloro-4-ethylphenyl isocyanate.

Any departure from the detailed description herein which conforms to the principle of the invention, namely, to the use of tetramethyl urea as a solubilizing agent in the preparation of an isocyanate by the reaction of an amine with phosgene in an inert organic liquid diluent, is intended to be included within the scope of the claims below.

I claim:

1. In a process for preparing an aromatic isocyanate by reacting the aromatic amine corresponding thereto with phosgene in an inert organic liquid diluent, the improvement which comprises carrying out the reaction in the presence of a minor amount of tetramethyl urea.

2. In a process for preparing p-chlorophenyl isocyanate by reacting p-chloroaniline with phosgene in an inert organic liquid diluent, the improvement which comprises carrying out the reaction in the presence of a minor amount of tetramethyl urea.

References Cited in the file of this patent

UNITED STATES PATENTS

| Number | Name | Date |
|---|---|---|
| 2,362,648 | Lichty et al. | Nov. 14, 1944 |